United States Patent
Niermann et al.

(10) Patent No.: US 11,635,127 B2
(45) Date of Patent: Apr. 25, 2023

(54) SPINDLE GEAR

(71) Applicant: igus GmbH, Cologne (DE)

(72) Inventors: Stefan Niermann, Cologne (DE); Sebastian Polle, Cologne (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 17/282,751

(22) PCT Filed: Oct. 4, 2019

(86) PCT No.: PCT/EP2019/076885
§ 371 (c)(1),
(2) Date: Apr. 3, 2021

(87) PCT Pub. No.: WO2020/070273
PCT Pub. Date: Apr. 9, 2020

(65) Prior Publication Data
US 2021/0310548 A1    Oct. 7, 2021

(30) Foreign Application Priority Data

Oct. 4, 2018    (DE) .................... 20 2018 105 683.2

(51) Int. Cl.
*F16H 25/20*    (2006.01)
*F16H 25/24*    (2006.01)
(52) U.S. Cl.
CPC ..... *F16H 25/24* (2013.01); *F16H 2025/2028* (2013.01)
(58) Field of Classification Search
CPC .................... F16H 25/24; F16H 2025/2028
See application file for complete search history.

(56) References Cited

U.S. PATENT DOCUMENTS

2007/0264100 A1    11/2007  Fujii et al.
2009/0282935 A1*   11/2009  Synovzik ............... B60N 2/067
                                                        74/89.36
(Continued)

FOREIGN PATENT DOCUMENTS

DE               922095 C     1/1955
DE         202006009772 U1    8/2006
(Continued)

OTHER PUBLICATIONS

European Patent Office International Search Report for Application No. PCT/EP2019/076885, dated Dec. 17, 2019.
European Patent Office, English Abstract for DE202006009772 U1, printed on Mar. 26, 2021.
(Continued)

*Primary Examiner* — Zakaria Elahmadi
(74) *Attorney, Agent, or Firm* — Cahn & Samuels, LLP

(57) ABSTRACT

In a spindle gear mechanism (1) having a spindle component (2) with a spindle thread (21) which has a pitch which alters over a longitudinal axis of the spindle component (2), and having a threaded component (3) which engages in the spindle thread (21), wherein the two components (2; 3) can be displaced relative to one another in relation to the longitudinal axis (1) of the spindle component (2), provision is made, for the purpose of straightforward production capability and suitability for a large number of applications, for the threaded component (3) to have at least one freely movable threaded element (4) which engages in the spindle thread (21) and, during operation, adapts automatically to the pitch of the spindle thread (21).

18 Claims, 5 Drawing Sheets

(56) References Cited

U.S. PATENT DOCUMENTS

Figure 6A:
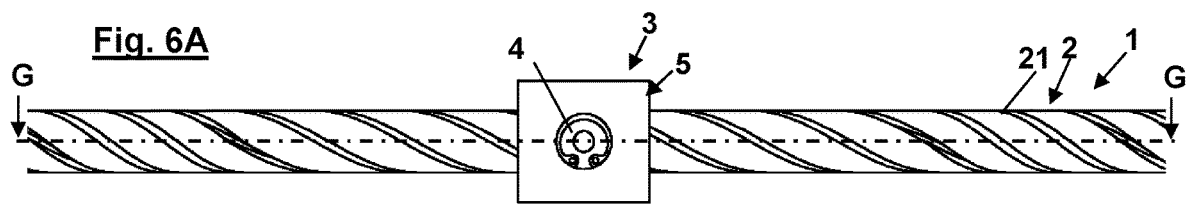
Figure 6B:
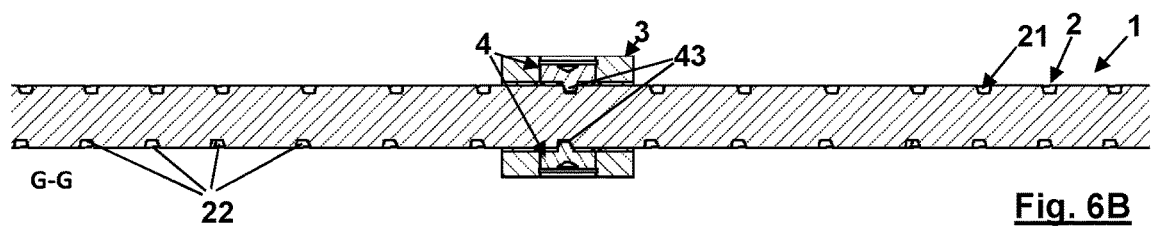

| | | | | |
|---|---|---|---|---|
| 2010/0192714 A1* | 8/2010 | Beneker | ............... | B21D 53/88 |
| | | | | 29/505 |
| 2013/0160583 A1* | 6/2013 | Kai | ............... | F16H 25/2261 |
| | | | | 74/89.23 |
| 2018/0319420 A1* | 11/2018 | Huber | ............... | B62D 1/181 |

FOREIGN PATENT DOCUMENTS

| | | | |
|---|---|---|---|
| DE | 112005002820 T5 | | 10/2007 |
| DE | 102007034211 A1 | | 1/2009 |
| DE | 102007039823 A1 | | 2/2009 |
| DE | 102008000346 A1 | | 8/2009 |
| DE | 102016015127 B3 | * | 5/2018 |
| EP | 2075488 A1 | | 1/2009 |
| JP | 2007016797 A | | 2/2006 |
| JP | 2006046546 A | | 1/2007 |
| TW | 200500002 A | | 1/2005 |

OTHER PUBLICATIONS

European Patent Office, English Abstract for EP2075488 A1, printed on Mar. 26, 2021.
European Patent Office, English Abstract for DE 102008000346 A1, printed on Mar. 26, 2021.
European Patent Office, English Abstract for DE922095 C, printed on Mar. 26, 2021.
European Patent Office, English Abstract for TW200500002 A, printed on Mar. 26, 2021.
European Patent Office, English Abstract for DE102007034211 A1, printed on Mar. 26, 2021.
European Patent Office, English Abstract for DE102007039823 A1, printed on Mar. 26, 2021.
European Patent Office, English machine translation for DE112005002820 T5, printed on Apr. 9, 2021.
Japanese Patent Office, English Abstract for JP2006046546 A, printed on Apr. 1, 2021.
Japanese Patent Office, English Abstract for JP2007016797 A, printed on Apr. 1, 2021.

* cited by examiner

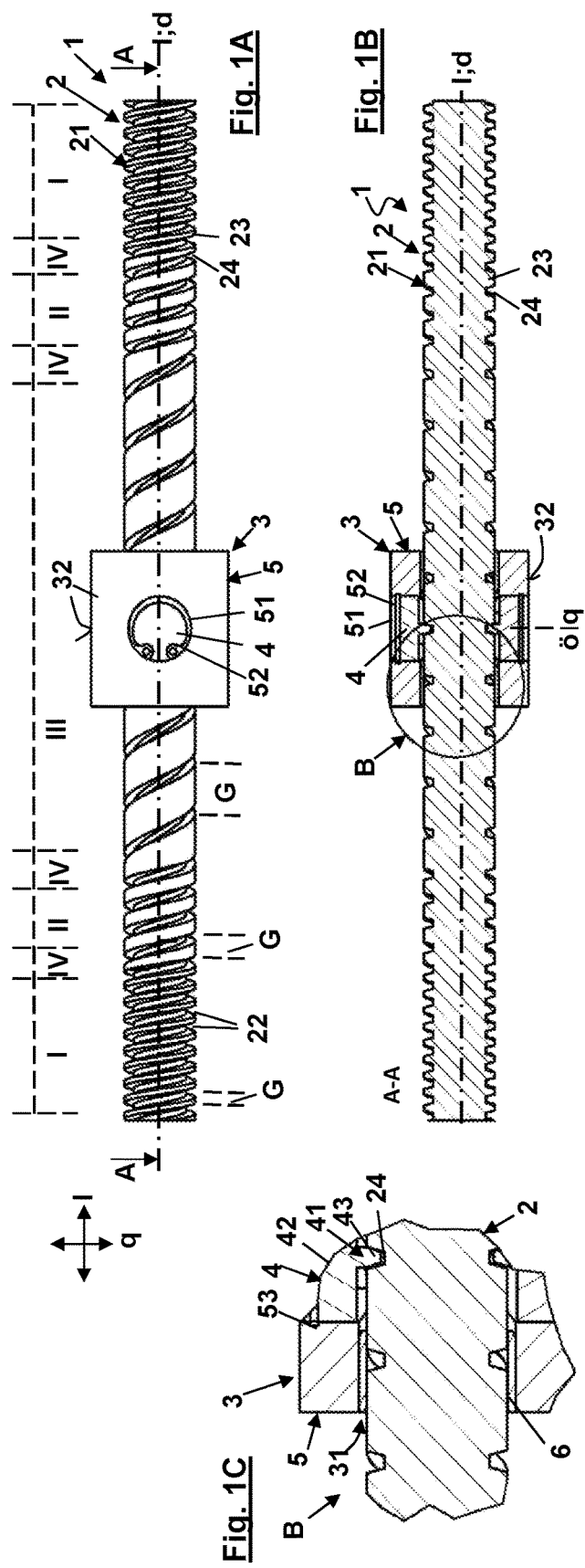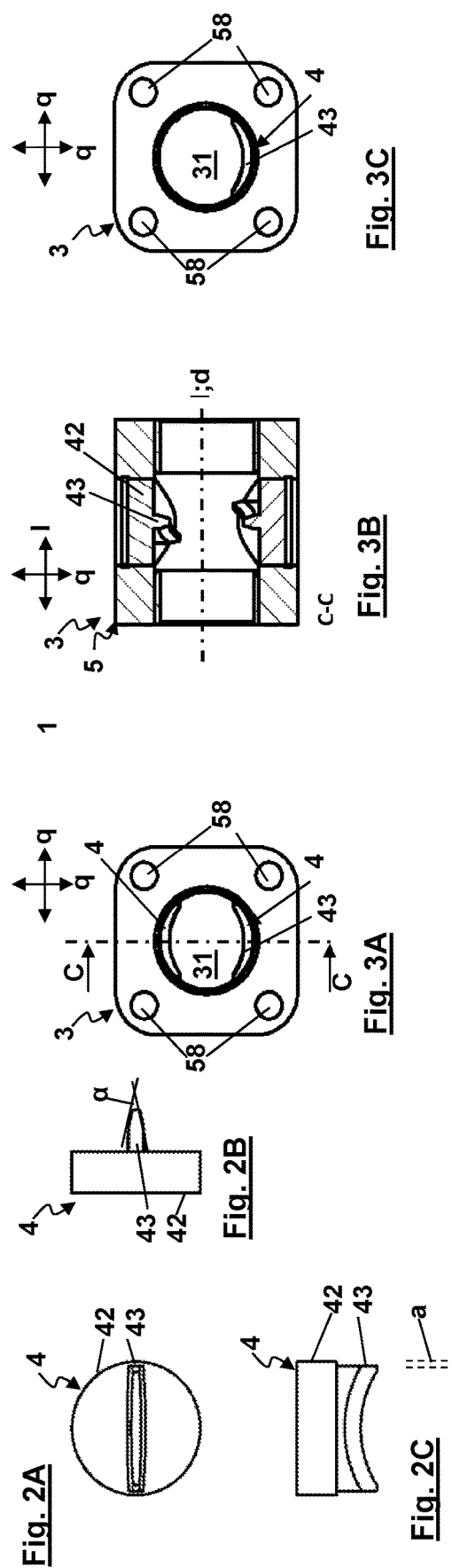

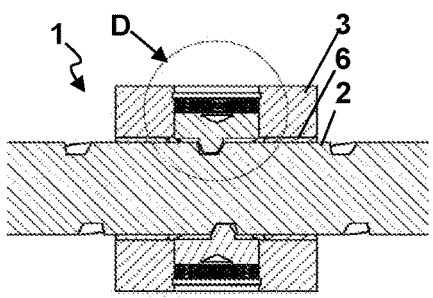
Fig. 4A
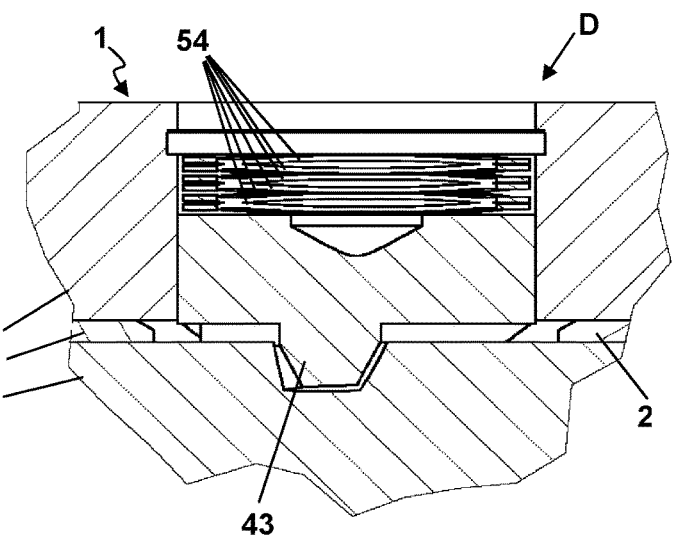
Fig. 4B
Fig. 5A
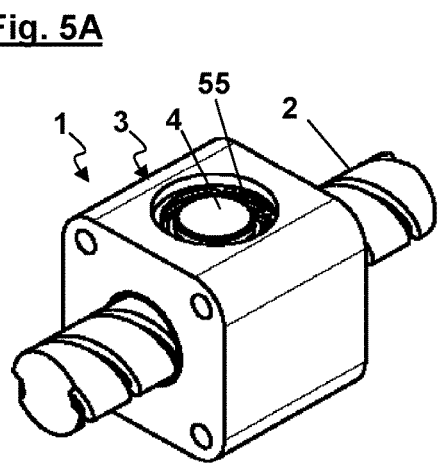
Fig. 5B
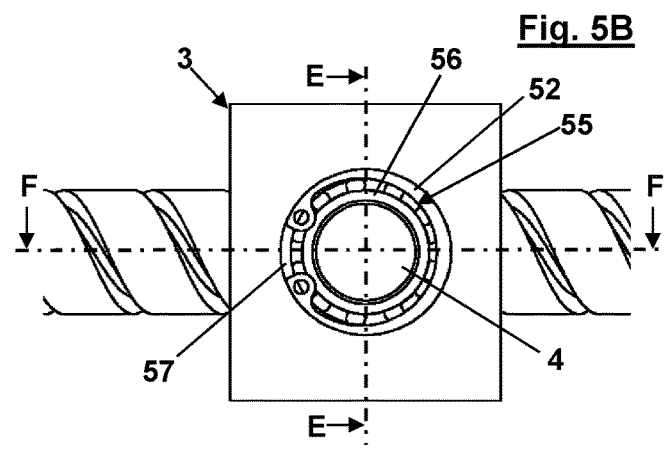
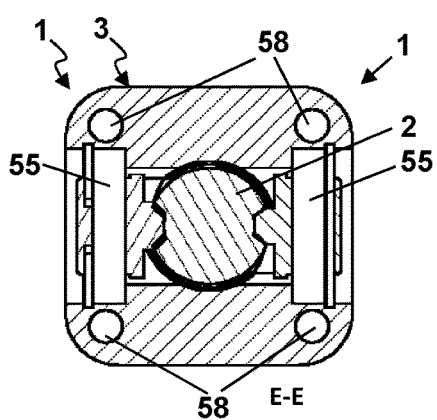
Fig. 5D
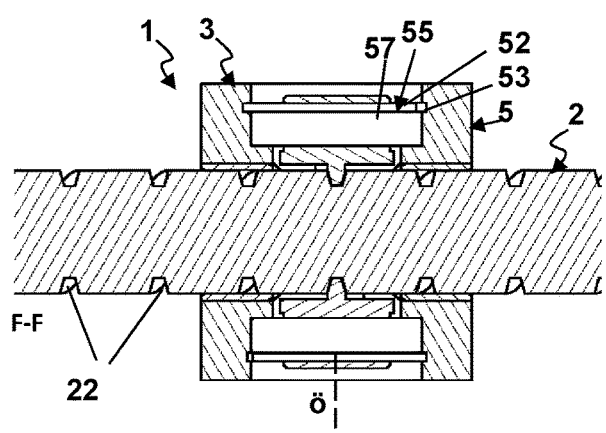
Fig. 5C

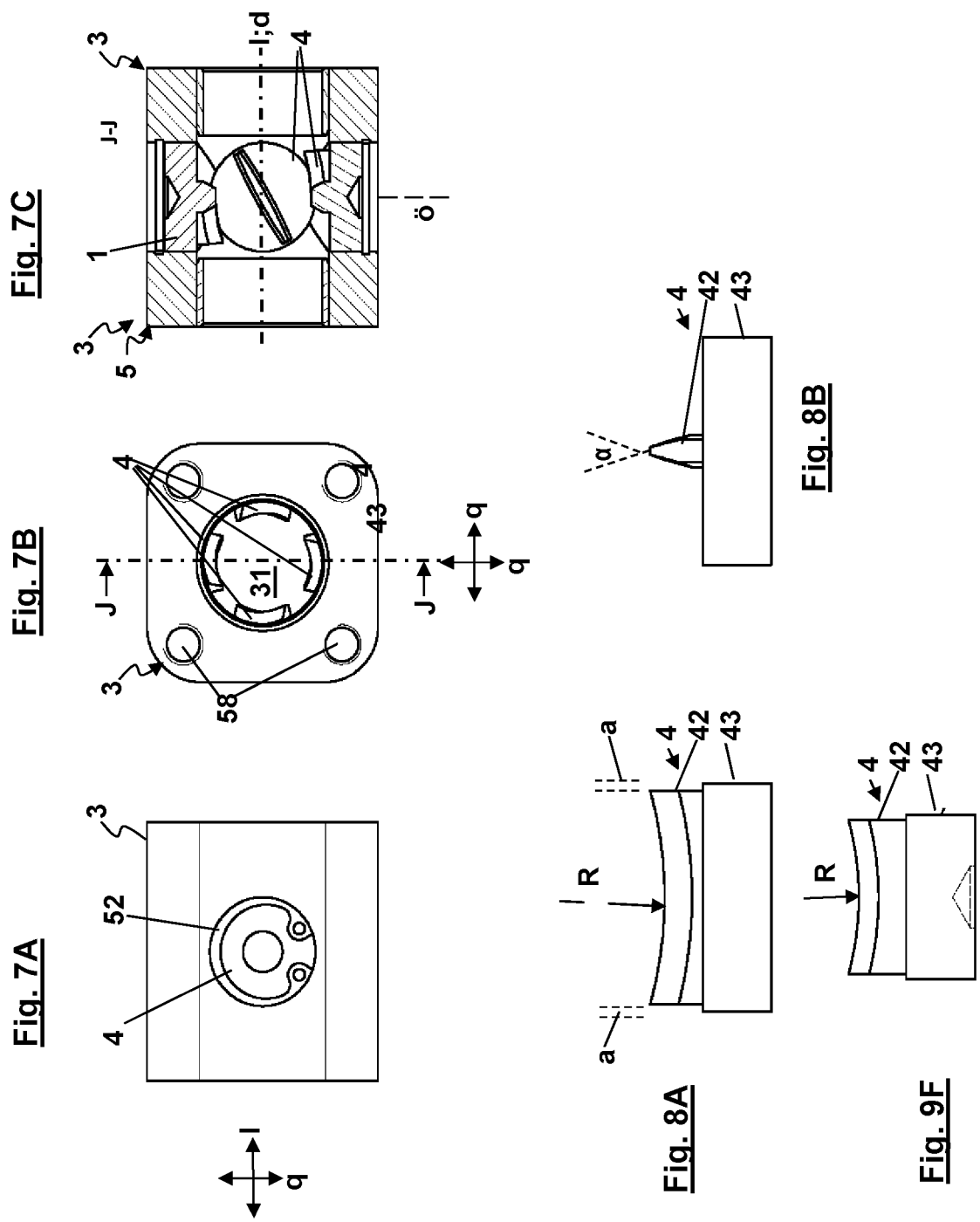

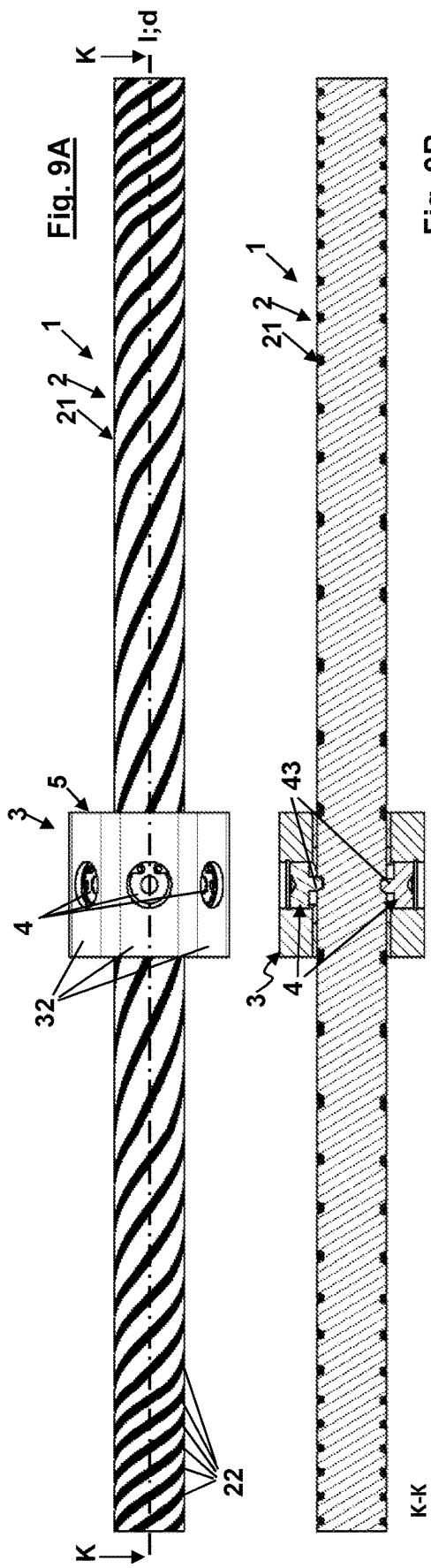
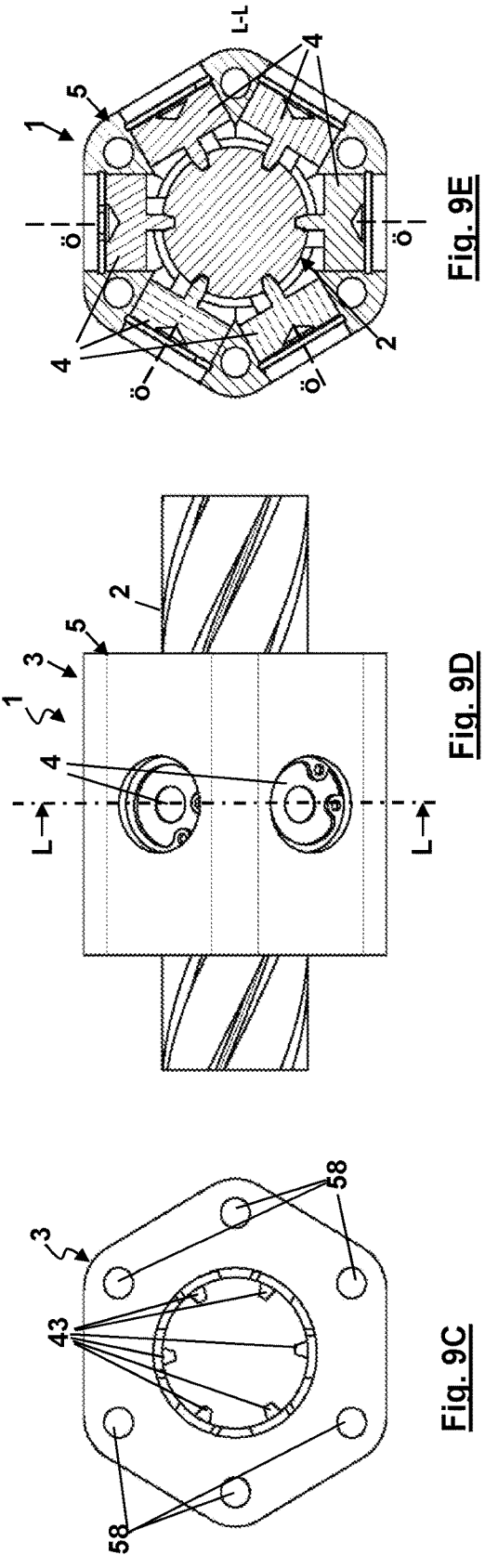

SPINDLE GEAR

I. FIELD OF THE INVENTION

This application is the National Stage of International Application No. PCT/EP2019/076885, filed on Oct. 4, 2019, which claimed the benefit of German Application No. DE 20 2018 105 683.2 filed Oct. 4, 2018, which are hereby both incorporated by reference.

The invention concerns a spindle gear having a spindle component with a spindle thread having a pitch which varies over a longitudinal axis of the spindle component and a thread component which engages into the spindle thread, wherein the two components are displaceable relative to each other with respect to the longitudinal axis of the spindle component.

II. BACKGROUND OF THE INVENTION

Displacement of the two components, that is to say the thread component and the spindle component, relative to each other in the longitudinal direction of the spindle component is usually effected with relative rotation of those two components about an axis of rotation. The displacement of the spindle component relative to the thread component with respect to each other generally takes place over a linear displacement travel path.

JP 2007 0160 797 A describes a spindle gear having a thread spindle, wherein the pitch of the spindle thread varies discontinuously in small alternate steps which is a complicated and expensive configuration. In that case the pitch of a portion is equal to zero and the pitch of the adjacent portion peripherally flanking it is greater than zero. That measure serves, by way of a nut adapted thereto, to fix a workpiece between the spindle and the nut without a higher level of pressing force being required for that purpose.

With the same close aim DE 11 2005 002 820 T5 proposes a spindle gear having a screw as the spindle component. Similarly to JP 2007 0160 797 A the inclinations periodically vary, but in this case the transition between the pitch portions occurs continuously, that is to say without an interruption, abrupt change or the like.

The procedure is similar in JP 2006 046 546 A, wherein the pitch of the female thread of a nut varies over the longitudinal axis of the spindle component.

III. SUMMARY OF THE INVENTION

Taking the above-indicated state of the art as the basic starting point the object of the present invention is to propose a spindle gear having a spindle component and a thread component, which can be produced more easily and with less complication and which is also suitable for a multiplicity of applications.

In the simplest embodiment the object is already attained in that the thread component has at least one freely moveable thread element which engages into the spindle thread and in operation automatically adapts to the thread pitch of the spindle thread.

This procedure involves taking a completely different structural path from the previously known state of the art. In the state of the art the cooperating gear components are usually structurally matched to each other. According to the invention however the at least one thread element is freely moveably arranged. As described in detail hereinafter it can automatically adapt to the thread pitch of the spindle component, which varies over a displacement travel path, by being oriented to the respectively current thread pitch. In a displacement of the spindle component relative to the thread component it can automatically adapt to the pitch configuration of the spindle thread. Automatically means that the freely moveable thread element is adapted or oriented without any further measure. By virtue of the measure according to the invention, as described in greater detail hereinafter, it is possible structurally in a simple fashion to provide a spindle gear in which the pitch of the spindle component, in the context of the forces which can be transmitted according to the invention by way of the spindle gear, alters as desired and as frequently as desired. Elastic deformation of the thread component is not necessary in operation. That could even have a detrimental effect in regard to optimum coupling of the spindle thread and the thread component.

By virtue of the measure according to the invention the spindle gear can be conceived for a multiplicity of possible applications and/or created adapted specifically to given possible applications. By way of example it is possible to provide a relatively small pitch over an axial portion of the spindle thread of the spindle component so that, upon a relative rotary movement, a correspondingly short relative travel can be involved, but higher forces can be transmitted. In contrast in another axial portion of the spindle thread the spindle thread can be of a relatively high pitch so that, upon a relative rotary movement, a correspondingly great relative travel is involved, but lower forces can be transmitted. The values of the various pitches can be established in a range which as the lower limit involves a slight pitch with a self-locking effect and as the upper limit a pitch which is so great that the spindle gear is very easily moveable and smoothly. A pitch with a self-locking action as an effect upon displacement can be used for example in regard to the displacement travel for providing an intermediate stop or an end stop. A large pitch with easy smooth movement upon displacement can be used for example for fast linear relative movement. The pitch can vary over the entire spindle thread, alternatively over at least one portion or a plurality of portions of the spindle thread. The spindle gear can thus be of a design which is structurally easily adapted to specific uses.

In particular the at least one thread element and the spindle thread are coupled together in particular in operative force-transmitting relationship. The at least one thread element engages into the spindle thread with respect to the longitudinal axis of the spindle component in force-transmitting and in principle also torque-transmitting relationship. Force-transmitting relationship means the transmission of axial forces, in particular with respect to the longitudinal axis of the spindle component. Torque-transmitting relationship means the transmission of torques, in particular with respect to the longitudinal axis of the spindle component, but this is affected by friction between the cooperating units involved in the movement. For receiving the torque there is usually provided a torque support means by the spindle component or, with the reversed structure with the thread component, being in the form of a rotating component and by the spindle component being in the form of a linearly moveable component, the spindle component being non-rotatably mounted for example on a base. As usual the spindle component and the thread component can be arranged coaxially with the longitudinal axis. The longitudinal axis can be the central longitudinal axis of the spindle component. The longitudinal axis forms the axis of rotation for the spindle gear. The thread component or the spindle component can be arranged fixed axially for example being held to a base. That base can be for example a part of a machine. In particular, the base can be a working end of a robot arm. The spindle component can be a spindle having a male thread.

The thread component can have a body. In a structurally simple design the at least one thread element can be mounted on or in the body moveably about a and/or in the direction of a transverse axis perpendicular to the longitudinal axis of the spindle component. To be able to follow the variation in the thread pitch of the spindle thread upon displacement over the length thereof the thread element can be arranged moveably at least about the transverse axis. In particular the at least one thread element can be arranged to be mounted to the thread component at least rotatably or pivotably moveably transversely relative to the longitudinal axis or to the central longitudinal axis.

In a development of the spindle gear, the at least one thread element can have a thread portion which with respect to the longitudinal axis of the spindle component respectively engages into the spindle thread in the working position in force-transmitting relationship. The thread portion means a part of a helical configuration of the thread. The thread portion can be of a corresponding configuration in the manner of a segment of a circular ring. The thread portion can be adapted for force-transmitting engagement into the spindle thread.

The thread element or the thread portion of the thread element can be of a design adapted to the spindle thread. For example, it can have a constant identical flank angle. That can be equal to the flank angle of the spindle thread. The thread component can engage like a thread nut with respect to the longitudinal direction of the spindle component radially inwardly into the male thread of the spindle component. At least in that case the thread component can be referred to as a thread nut. In a reversed arrangement, the invention can include as the spindle component a hollow spindle with a female thread, into which the thread component engages radially outwardly with the at least one thread element with respect to the longitudinal direction of the spindle component.

The thread portion can be of a linear configuration easily in terms of structure and manufacture. In particular, the thread portion can also extend in an arcuate configuration in the peripheral direction with respect to the longitudinal axis of the spindle component. Inter alia dependent on the number of possible thread flights provided the thread portion can extend in the peripheral direction over an arcuate extent of <n/2 with respect to the longitudinal axis.

In regard to its linear longitudinal extent, the thread portion can extend to or almost to the outer edge of the thread element. Almost means that the spacing of the thread portion from the outer edge of the thread element at the location at which the linear longitudinal extent faces at the end towards the outer edge is less than 10% or less than 2% of the linear longitudinal extent of the thread portion. That serves inter alia for mechanical protection for the ends of the thread portion, in relation to the longitudinal extent of the thread portion.

In an advantageously simple configuration the thread portion can have a thread tooth portion and/or a thread groove portion. The thread tooth portion can be formed by a rib-like projection. The thread groove portion can be formed by a continuous groove.

In particular, the thread portion can peripherally extend over a region ≤85%±5% or over a region ≤60%±5% respectively of the nominal diameter of the spindle component with respect to the longitudinal axis of the spindle component. That extent of the thread portion of up to 85%±5% of the diameter or nominal diameter of the spindle component is appropriate in relation to a spindle thread with up to four thread flights. With more than four thread flights as for example in the case of a six-flight spindle component the length of the portion can be ≤60%±5% of the diameter or nominal diameter of the spindle component.

If the spindle thread is cut through inclinedly relative to the longitudinal axis and in a plane with its pitch that results in an elliptical or approximately elliptical sectional surface. Adapted thereto, the outer contour of the thread portion, which is towards the spindle component and which is peripheral in the installation position relative to the longitudinal axis of the spindle component, can be of a curved configuration concavely inwardly, that is to say towards its base. The peripheral outer contour of the thread portion can be of a concave and also elliptical or approximately elliptical configuration, adapted to a pitch of the spindle thread. The peripheral outer contour of the thread portion can be of an arcuate configuration. It can also extend in an arcuate range over <n/2. Advantageously in regard to an optimum, that is to say low-friction, engagement of the thread portion into the spindle thread, the outer contour can be adapted to the largest pitch of the spindle thread. In addition, the outer contour can be adapted to the region of the elliptical sectional surface, in which the outer contour of the elliptical sectional surface is of the largest radius of curvature. As is known that region is where the elliptical sectional surface is of the smallest diameter.

In the installation position, the thread portion advantageously extends longitudinally in the direction of the helical line. In operation therefore, in dependence on the actual pitch at the location of the spindle thread, at which the thread portion engages into the spindle thread, it can thus extend with respect to the longitudinal axis generally substantially in the peripheral direction with respect to the longitudinal axis of the spindle component.

In a development of the spindle gear the thread portion can be of a tapering configuration at both ends in relation to its easier orientation in respect of a variation in pitch of the spindle thread in relation to its longitudinal extent. For that purpose the thread portion, with respect to a longitudinal section in the direction of its linear longitudinal extent, can have an oval or elliptical outer contour. The outer contour in particular can be of a lens-shaped configuration. In the installation position that longitudinal section is a cross-section with respect to the transverse direction. The thread portion can alternatively be for example of a wedge-like tapering configuration.

In a simple structure, the thread element can have a base, with the thread portion being arranged at the side of the base, that is towards the spindle thread in the installation position. The base can be a carrier for the thread portion. The base can be mounted to the body and the thread portion can be coupled to the spindle thread. The base can be guided on the body and the thread portion can be arranged guided on the spindle thread.

In an advantageously simple structure the body can have a receiving opening in which the thread element is arranged at least rotatably or pivotably moveably. The receiving opening can be oriented radially with respect to the longitudinal axis in the installation position. Radially means in the transverse direction relative to the longitudinal direction of the spindle component. The opening axis of the receiving opening can thus extend transversely relative to the longitudinal direction of the spindle component. The base can serve for guiding the thread element in the receiving opening. The receiving opening can be in the form of a through opening. The thread element can be arranged to be mounted rotatably moveably with a plain bearing or rolling rotatably moveably with a rolling bearing in the receiving opening by way of its base with respect to the radial opening axis. For that purpose the receiving opening and the base of the thread element can be of mutually adapted round cross-sections. In a structurally simple fashion the thread element for plain-bearing rotatable mounting thereof in the receiving opening can have a circular outer contour adapted to the circular cross-section of the receiving opening.

In a development of the spindle gear there can be a rolling bearing having an inner race and an outer race for rolling rotable mounting of the thread element. The thread element can be fixed radially externally to the inner race of the rolling bearing with respect to an axis of the receiving opening. Alternatively the thread element can form the inner race of the rolling bearing. In both cases the outer race of the rolling bearing can be at least non-rotatably connected to the receiving opening at the inside thereof. For that purpose the receiving opening can be in the form of a stepped opening, wherein the outer race is held axially non-displaceably at the step of the receiving opening. The rolling bearing can be a rolling bearing having rollers or balls.

The rolling bearing can be in the form of a radial bearing. In that way the thread element is supported transversely relative to the axis of the opening and is mounted in the rolling bearing displaceably in the direction of the opening axis. Advantageously in regard to possible minimization of the play of the thread engagement of the thread portion of the thread component in the spindle thread of the spindle component it can be provided that the thread element engages under a spring loading into the spindle thread radially with respect to the longitudinal direction. In that way the thread element can be held in a radially pre-stressed condition. That measure is independent of the number of thread flights. The pre-stressing can be implemented using a leaf spring like a plate spring, or a compression spring like a coil compression spring or for example a disc comprising a rubber-elastic material like rubber, elastomer, caoutchouc or silicone caoutchouc.

In an advantageously simple fashion the thread element in the installation position can be arranged in the receiving opening to be secured against axial displacement in the radial direction away from the spindle thread. The thread element can be held by means of a securing ring like a clamping ring or a Simmerring to prevent such axial displacement.

The body of the thread component can be arranged to be mounted in plain-bearing slidingly displaceable relationship on the spindle component. That sliding displaceability can be afforded in the direction of the longitudinal axis and peripherally in relation thereto. To provide the slidingly displaceable mounting at least one plain bearing sleeve can be provided, being connected to the thread component and arranged between the body and the spindle component. In that way the body can be held at a given radial distance, determined by way of the radial thickness of the plain bearing sleeve, in relation to the spindle thread of the spindle component. That plain bearing-displaceable mounting is independent of the number of flights and the pitches of the spindle thread.

The spindle thread of the spindle component can be in the form of a trapezoidal thread. That has the advantage that larger pitches can be more easily implemented. In addition higher forces can be more easily transmitted by way thereof. In general the flank angle of the thread flight can be constant over its entire axial extent. That flank angle can be for example less than/equal to 45° or less than/equal to 30°. In particular the flank angle can be equal to 30°. The flank angle can also be equal to 29° with adaptation to the American ACME thread.

The spindle thread can include at least one thread flight. It can be of a configuration which is continuous over its entire axial extent in the longitudinal direction of the spindle component. The term "constant" is intended here in the mathematical sense, that is to say over the configuration of the pitch over the axial length of the spindle component, there is no kinking, interruption and/or abrupt change.

In an advantageous development of the spindle gear the spindle thread of the spindle component can have at least two thread flights. There can be one thread element for each thread flight. Accordingly in the case of a two-flight spindle thread there can be two thread elements which respectively engage into a thread flight associated therewith operative in force-transmitting relationship. Advantageously and necessarily in regard to appropriate displacement it is provided that the two thread elements, each with respect to the longitudinal axis of the spindle component, are arranged at the same level and peripherally equally spaced on the body of the thread component. Advantageously in terms of manufacture and assembly the two thread elements can be of the same structural configuration. In particular all thread elements used in the spindle gear are of structurally identical configuration.

In its basic shape the body can be of a ring shape. It can have radially outwardly outside surfaces which in the installation position are arranged perpendicularly to the transverse direction and radially inwardly a circular opening for receiving the spindle component. The outside surfaces are preferably identical. They form a polygonal cross-section with identical sides. A respective receiving opening can be provided in at least one of the outside surfaces, preferably in all thereof, wherein the receiving openings are peripherally equally spaced with respect to the longitudinal axis of the spindle thread. That structure simplifies manufacture and assembly.

If for example there is provided a four-flight or a six-flight spindle thread then the cross-section of the outer contour can be a square or a hexagon respectively. The number of possible thread flights as is known depends inter alia on the nominal diameter of the spindle component.

In a simple configuration in regard to manufacture the spindle component, the body of the thread component and/or the thread elements can respectively be of a one-piece configuration, in particular a one-piece injection molded component.

The thread element or elements can be respectively made from metal, in particular aluminum with hard anodizing or plastic. The body can be made from metal, in particular steel or aluminum with anodizing, or plastic. The spindle component can be made from metal like aluminum or steel or plastic.

In advantageous embodiments the spindle gear has one or more of the features set forth hereinbefore as preferred (in any combination).

Further details and advantages of the invention will be apparent hereinafter, without limitation in respect of the scope of protection from the description of a number of preferred embodiments with reference to the accompanying drawings in which:

IV. BRIEF DESCRIPTION OF THE DRAWINGS

FIGS. 1A-1C each show a view of an embodiment of a spindle gear having a spindle component and a body and a thread component having thread elements, FIGS. 2A-2C each show a view of one of the thread elements of the spindle gear shown in FIGS. 1A-1C, FIGS. 3A-3B each show a view of the thread component of the spindle gear of FIGS. 1A-1C, FIG. 3C shows a side view of the thread component similarly to that shown in FIGS. 3A-3C but with a single thread element, FIGS. 4A-4B each show a portion in a sectional view of a further embodiment of the spindle gear, FIGS. 5A-5D each show a view of a further embodiment of the spindle gear as a side view or a sectional view, FIGS. 6A-6D each show a view of a further embodiment of the spindle gear, FIGS. 7A-7C each show a view of the thread component of the spindle gear of FIGS. 6A-6D, FIGS. 8A-8B each show a view of the thread element of the spindle gear shown in FIGS. 6A-6D, FIGS. 9A-9E each show a view of a further embodiment of the spindle gear, and FIG. 9F shows a view of the thread element of the spindle gear of FIGS. 9A-9E.

V. DETAILED DESCRIPTION

FIGS. 1A-9F show views of a spindle gear 1 in various views, sections and as individual figures. The spindle gear 1 has a spindle component 2 having a spindle thread 21 which includes a pitch which varies over a longitudinal axis l of the spindle component 2. The spindle gear 1 further has a thread component 3 which engages into the spindle thread 21, wherein the two components 2, 3 are displaceable relative to each other with respect to the longitudinal axis 1 of the spindle component 2. According to the invention the thread component 3 has at least one freely moveable thread element 4. Such an embodiment of the spindle gear 1 is shown in FIG. 3C and more specifically by means of a side view of a thread component 3 with a thread element 4 for engagement into a single-flight spindle thread 21 of the spindle component 2. In the other embodiments shown herein of the spindle gear 1 there are at least two freely moveable thread elements 4. The thread elements 4 respectively engage into the spindle thread 21 and in operation automatically adapt to the thread pitch of the spindle thread 21, which varies over the longitudinal axis l of the spindle component 2.

In the embodiments shown herein the spindle thread 21 is arranged radially externally on the spindle component 2. The thread component 2 is arranged coaxially and radially outwardly relative to the spindle component 2, with respect to the longitudinal axis 1. For that purpose the thread component 3 has a through opening 31 through which the spindle component 2 engages. In the embodiment shown here of the spindle gear 1 the spindle component 2 is of a multi-flight configuration which is advantageous in terms of force mechanics, wherein arranged in each thread flight 22 is a thread element 4. The thread elements 4, with respect to the longitudinal direction l, are arranged mounted on the thread component 3 at a level and peripherally equally spaced. The at least two thread elements 4 are also in one piece and of identical structure. The invention however is not limited to one of those measures.

The pitch can vary over the entire longitudinal extent of the spindle thread 21. In the embodiments illustrated here of the spindle gear 1 however it is provided that the pitch is admittedly different in given portions I-III of the spindle thread 21, but remains constant. In FIG. 1A the pitches of different values in the regions I-III are shown in the form of the respective flight pitch G, that is to say in the form of the axial distance covered in a revolution of the spindle component 2. In addition provided between the regions I-III are a respective region IV in which the pitch of the one region transitions continuously or in a mathematical sense steadily into that of the other region. The regions I-IV are here arranged perpendicularly to the longitudinal axis 1 of the thread spindle 2, with respect to a plane of mirror symmetry. In regard to the axial pitch configuration the spindle threads 21 of all embodiments illustrated here of the spindle gear 1 are of the same configuration, but the invention is not limited thereto. The spindle thread 21 here is in the form of a trapezoidal thread which has a flank angle α, with a thread tooth 23 which is flattened off at the free end.

The thread component 3 has a body 5 on which the thread elements 4 are respectively arranged mounted rotatably or displaceably about a and in the direction of a transverse axis q perpendicularly to the longitudinal axis 1 of the spindle component 2. The thread elements 4 each have a thread portion 41 which, with respect to the longitudinal axis l of the spindle component 2, engages in the working position into the spindle thread 21 radially inwardly in force-transmitting relationship. The thread portion 41 in itself can be viewed as a part of the helical configuration of a nut thread (not shown here) in the form of a thread tooth portion 43, with which the thread element 4 engages into the thread groove 24 of the thread flight 22, associated therewith, of the spindle thread 21 in force-transmitting relationship. In that respect the thread component 3 with the thread elements 4 can also be referred to as a thread nut. The thread element 4 can thus be oriented automatically without an external influence to the varying thread pitch of the spindle component 2. The thread portion 41 is adapted to the spindle thread 21. For that purpose it has for example an identical constant flank angle α like the spindle thread 21. In the embodiments illustrated here the flank angle α is equal to 30°.

The thread element 4 has a base 42. This is a carrier for the thread portion 41 and is further integrally connected thereto. The thread portion 41 extends rib-like over the side of the base 42, that in the installation position is towards the spindle thread 21. The base 42 is mounted freely moveably to the body 5. The thread portion 41 is coupled to the spindle thread 21 in force-transmitting relationship.

The thread portion 41 has a line-like configuration. As can be seen from FIGS. 2C and 8A the thread portion 41 does not extend over the entire base 42, with respect to its longitudinal extent, in the direction of its line-like configuration, but ends for protection thereof at both ends at a spacing a from the edge of the base 42.

As can be clearly seen from the individual views of the thread element 4 in FIGS. 2C, 8A and 9F the thread portion 41 is of an arcuate configuration and is curved concavely inwardly to its base 42. The outer contour of the thread portion 41, that is towards the spindle component 2 and is peripheral relative to the longitudinal axis l, is of a concave configuration being adapted to the pitch of the spindle thread. In the embodiments illustrated here the thread portion 41 is similar to a part of a helical configuration of a female thread of a screw nut (not shown here). As however the pitch of the spindle thread 21 varies over the longitudinal axis, that is to say over the axial extent of the spindle component 2, the pitch of the thread of the screw nut, in a state of being adapted thereto, would also have to be correspondingly varied. According to the invention that problem is resolved by the use of the freely moveable thread elements 4 instead of the thread of the screw nut.

Figure 6D:
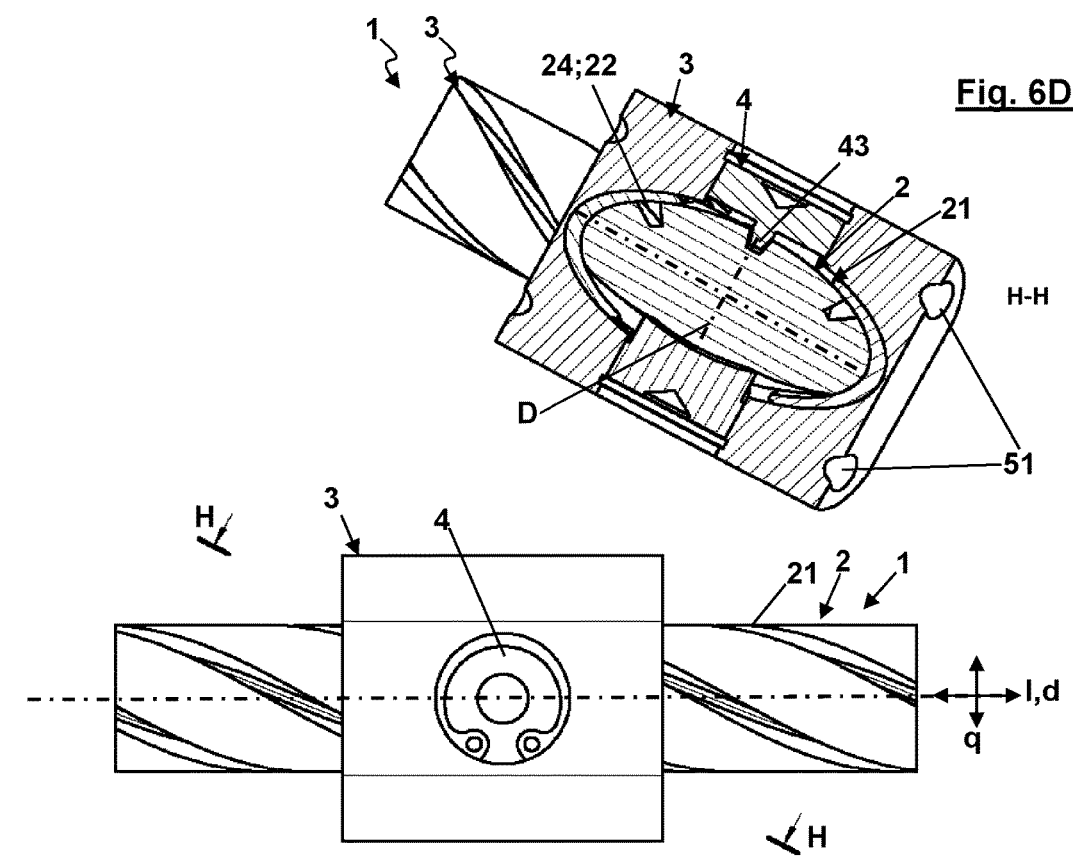
Figure 6C:
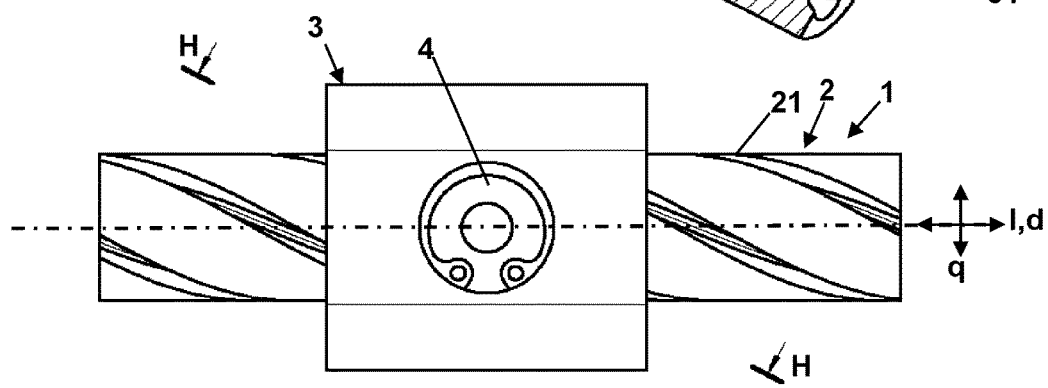

With the change in the pitch, with the nominal diameter remaining the same, the arcuate shape or the radius of the thread flights also varies. To illustrate this FIG. 6D shows a sectional view H-H taken from FIG. 6C, with the section plane extending parallel to the pitch inclinedly relative to the longitudinal axis 1 of the spindle component 2. FIG. 6C in turn shows a central region of the spindle gear 1 of FIG. 6A with the thread component 3, wherein the pitch of the spindle thread 21 is at a maximum in that region. The spindle component 2 with the spindle thread 21 is a right circular cylinder, in terms of the basic shape. If a circular cylinder is cut inclinedly relative to its cylinder axis the resulting sectional surface is known to be of an elliptical contour with two diameters, that is to say a larger diameter and a smaller diameter D perpendicularly to the larger diameter, wherein in FIG. 6D only the smaller diameter D is identified for better readability of the drawing.

The arcuate shape of the peripheral outer contour of the thread portion 41 is adapted to the elliptical outer contour of the spindle thread 21 at the location of the smaller diameter D. At the same time adaptation is implemented at the location at which the pitch of the spindle thread is at a maximum over its axial extent. At the same time therefore it is the location at which the radius of the arcuate shape of the elliptical outer contour of the spindle thread 21 is at the maximum. Such a radius R is identified by way of example in FIGS. 8A and 9F. Those measures are advantageous in terms of minimizing friction and the transmission of force of the cooperating gear components in operation of the assembly.

For easier sliding movement of the thread portion 41 in the thread groove 24 of the spindle thread 21 and for an easier variation in the orientation thereof upon a change in pitch the thread portion 41 of the thread elements 4, with respect to the longitudinal extent l thereof, is of a tapering configuration at both ends in the direction of its linear configuration. The thread portion 41 is of a lens-like longitudinal sectional shape with respect to its longitudinal extent.

For each thread element 4, the body has a receiving opening 51 which is radial with respect to the longitudinal axis 1 and which in the installation position extends in the transverse direction q. Arranged rotatably therein is the respectively associated thread element 4. As can be seen for example from FIGS. 1B and 3B the receiving opening 51 is in the form of a through opening. The thread elements 4 are respectively mounted in the associated receiving opening in plain-bearing rotatable or rolling-bearing rotatable relationship by way of their base 42 with respect to the opening axis ö of the radial receiving opening 51. For that purpose the receiving opening 51 and the base 42 of the thread element 4 are of mutually adapted circular cross-sections.

Except for the embodiment of the spindle gear 1 shown in FIGS. 5A-5C with a rolling bearing arrangement using a ball bearing 55 for the thread elements 5 in the receiving opening 51 the other embodiments illustrated in the drawing of the spindle gear 1 have a plain bearing arrangement. That is admittedly less expensive and less complicated in comparison with the rolling bearing arrangement but it gives rise to a higher level of friction in operation. In all embodiments the thread element 4 is secured radially outwardly to prevent axial displacement in the direction of the opening axis ö. In the embodiments illustrated here of the spindle gear 1 for that purpose there is provided a respective Simmering 52. That engages in positively locking relationship under a spring prestressing which is radial with respect to the opening axis ö at an intended position in which the associated thread element 4 is arranged in a condition of being brought into appropriate thread engagement with the spindle thread 21 of the spindle component 2, into an internal groove 53 provided at the inside of the receiving opening 51.

In the embodiment of the spindle gear 1 shown in FIGS. 4A and 4B, to prevent play between the cooperating gear components 2; 3, there is additionally provided a bearing means for the thread elements 4, that is resilient in the direction towards the spindle thread 21. By way of example provided here are six plate springs 54 which are arranged in succession in spring relationship. This provides that the thread elements 4 in the installation position are respectively arranged in a radially prestressed state.

In regard to the bearing arrangement provided in FIGS. 4A and 4B for the thread element 4 by way of ball bearings 55 with an inner race 56 and an outer race 57 it is provided that the thread elements 4 are respectively fixed radially outwardly to the inner race 56 with respect to the opening axis ö of the receiving opening 51. The outer race 57 of the ball bearing 55 is arranged held non-rotatably at the inside of the receiving opening 51 to same with respect thereto and here also axially with respect to the spindle thread 21.

In all embodiments of the spindle gear 1 illustrated in the drawing the thread component 3 is mounted on the spindle component 2 axially and peripherally slidingly displaceable by way of two plain bearing sleeves 6. The plain bearing sleeves 6 are fixedly connected to the thread component 3. The two plain bearing sleeves 6 are arranged axially spaced from each other with respect to the longitudinal axis 1, leaving the receiving openings 51 free. They terminate axially flush at both ends with the thread component 3.

In the embodiments illustrated here the spindle component 2, the thread component 3 and the thread elements 4 are respectively made in one piece from plastic.

The thread component 3, in respect of its outer contour, is in the form of a right prism with equal prismatic outside surfaces 32 respectively arranged perpendicularly to the transverse direction q. By virtue of that feature the thread component 3 can be arranged to be held in an uncomplicated fashion by way of at least one of the outside surfaces 32 in sliding displaceable relationship and non-rotatably for example in relation to a housing (not shown here). For that purpose that outside surface 32 can have associated therewith a correspondingly adapted side surface of the housing. The number of prismatic outside surfaces 32 is so matched to the number of thread elements 4 that the provided thread elements 4 are respectively arranged centrally relative to the associated outside surface 32 and peripherally equally spaced relative to each other. In addition, provided only in the outside surface 32 of the thread component 3 is a respective receiving opening 51, for which there is also provided a respective thread element 4. This is advantageous in relation to possible ingress of particles through a receiving opening 51 which is not in use into the thread engagement between the thread element 4 and the spindle thread 21.

As, except for FIG. 3C, it is possible to see from FIGS. 1A-5B with the illustration of a two-flight spindle thread 21, the thread component 2 is of a square cross-section, wherein provided at two mutually opposite outside surfaces 32 with respect to the longitudinal axis 1, there is a respective receiving opening 51 having a thread element 4 mounted therein.

Referring to FIGS. 6A-8B there is provided a spindle component 2 having a four-flight spindle thread 21. There are four thread elements 4 corresponding to the number of thread flights 22. As can be seen in particular from the views of the thread component 3 in FIGS. 7B and 7C the thread component 2 is also of a square cross-section, with a thread element 4 being associated with each of the outside surfaces 32.

FIGS. 9A-9F show a spindle gear 1 with a six-flight spindle thread 21. Adapted thereto, the thread component is of a hexagonal cross-section, with a thread element 4 being associated with each of the outside surfaces 32 of which there are therefore six.

A comparison of the above-described spindle gears 1 with two-flight, four-flight and six-flight spindle threads 21 respectively shows that, as usual, the diameter of the spindle component 2 is adapted to the number of thread flights 22, wherein an optimum diameter increases with the number of thread flights 22. So that the thread components 3 with their respective thread element 4 do not impede each other in the installation position the thread components 3, depending on the number thereof, can extend over a given peripheral portion, with respect to their extent which is peripheral relative to the longitudinal axis 1. In the case of the two-flight spindle thread 21 and the two thread elements 4 necessary therewith the thread elements 4 respectively extend with respect to the longitudinal axis in the peripheral direction over an arcuate dimension of <π/2 or with respect to the nominal diameter over a peripheral region of less than or equal to 85%±5%. In the case of the six-flight spindle component shown in FIG. 9A the thread elements 4 respectively extend, with respect to the nominal diameter, over a peripheral region of less than or equal to ≤60%±5% of the nominal diameter of the spindle component 2.

The enlarged diameter of the spindle component 2 and the reduced peripheral extent of the thread components 3 with a rising number of thread flights 22 of the spindle thread 21 will also be clear at the concave curvature of the outer contour of the thread portion 41 insofar as that is of a shallower configuration with a rising number of thread flights 22. That is shown by a comparison of the thread element 4 shown in FIGS. 2C, 8A and 9F, for a two-flight, four-flight and six-flight spindle thread 21, respectively.

As can be seen for example from FIGS. 3A and 3C the thread component 3 has fixing openings 58 which are parallel to the longitudinal axis 1 and which are respectively in the form of a through opening for connection to a component (not shown here).

LIST OF REFERENCES 1 spindle gear
2 spindle component
21 spindle thread
22 thread flight
23 thread tooth
24 thread groove
3 thread component
31 through opening
32 outside surface
4 thread element
41 thread portion
42 base
43 thread tooth portion
5 body
51 receiving opening
52 Simmering
53 internal groove
54 plate spring
55 ball bearing
56 inner race
57 outer race
58 fixing opening
6 plain bearing sleeve
I-IV region
a spacing
d axis of rotation
l longitudinal axis
ö opening axis
q transverse axis
D diameter
G flight pitch
R radius
α flank angle

The invention claimed is:

1. A spindle gear (1) comprising:
a spindle component (2) with a spindle thread (21) having a pitch which varies over a longitudinal axis (l) of the spindle component (2); and
a thread component (3) which engages into the spindle thread (3), and
wherein the two components (2, 3) are displaceable relative to each other with respect to the longitudinal axis (l) of the spindle component (2), and
the thread component (3) includes at least one freely moveable thread element (4) which engages into the spindle thread (21) and in operation automatically adapts to the thread pitch of the spindle thread (21);
the thread element (4) includes a thread portion (41) that with respect to the longitudinal axis (l) of the spindle component (2) respectively engages into the spindle thread (21) in the working position in force-transmitting relationship, in the installation position the thread portion (41) is arranged at the side of a base (42) of the thread element (4) which faces the spindle thread (21), and the thread portion (41) is of a linear configuration or extends in an arcuate configuration in the peripheral direction with respect to the longitudinal axis of the spindle component (2);
the thread component (3) further includes a body (5) with a receiving opening (51), designed radially as a through opening with respect to the longitudinal axis (l) of the spindle component (2) and aligned along an opening axis (ö), in which the thread element (4) is arranged by way of its base (42) mounted plain-bearing rotatably movably or rolling-bearing rotatably movably with respect to the opening axis (ö) of the receiving opening (51).

2. The spindle gear (1) as set forth in claim 1, wherein the at least one thread element (4) is arranged mounted on or in the body (5) moveably about a direction of a transverse axis (q) perpendicular to the longitudinal axis (l) of the spindle component (2) and/or in the direction of the transverse axis (q) perpendicular to the longitudinal axis (l) of the spindle component (2).

3. The spindle gear (1) as set forth in claim 1, wherein the thread portion (41) has a thread tooth portion (43) and/or a thread groove portion.

4. The spindle gear (1) as set forth in claim 1, wherein the thread portion (41) extends with respect to the longitudinal axis (l) peripherally over a region ≤85%±5% or over a region ≤60%±5% respectively of the nominal diameter of the spindle component (2).

5. A spindle gear (1) comprising:
a spindle component (2) with a spindle thread (21) having a pitch which varies over a longitudinal axis (l) of the spindle component (2); and
a thread component (3) which engages into the spindle thread (3), the thread component (3) has at least one freely moveable thread element (4) which engages into the spindle thread (21) and in operation automatically adapts to the thread pitch of the spindle thread (21), the at least one thread element (4) has a thread portion (41) which with respect to the longitudinal axis (l) of the spindle component (2) respectively engages into the spindle thread (21) in the working position in a force-transmitting relationship, and wherein the two components (2, 3) are displaceable relative to each other with respect to the longitudinal axis (l) of the spindle component (2); and wherein to the outside contour of the thread portion (41) which is towards the spindle component (2) and which is peripheral with respect to the thread element (1) is of a concave and also elliptical or approximately elliptical configuration adapted to a pitch of the spindle thread (21).

6. The spindle gear (1) as set forth in claim 5, wherein the outside contour is adapted to the greatest pitch of the spindle thread (21), more specifically corresponding to the region of the smaller diameter (D) of the elliptical or approximately elliptical shape.

7. The spindle gear (1) as set forth in claim 1, wherein the thread portion (41) is of a tapering configuration at both ends in relation to its easier orientation in respect of a variation in pitch of the spindle thread (21) in relation to its longitudinal extent.

8. The spindle gear (1) as set forth in claim 1, wherein the base (42) is supported on the body (5) and the thread portion (41) is coupled to the spindle thread (21).

9. The spindle gear (1) as set forth in claim 1, wherein the thread element (4) is at least rotatably or pivotably moveably arranged in the receiving opening (51).

10. The spindle gear (1) as set forth in claim 1, wherein the thread component (3) includes a rolling bearing with an inner race (56) and an outer race (57) for the rolling rotatably moveable mounting of the thread element (4), wherein the thread element (4) is fixed radially outwardly to the inner race (56) of the rolling bearing with respect to the opening axis (ö) of the receiving opening (51) or forms the inner race (56) of the rolling bearing and wherein the outer race (57) of the rolling bearing is at least non-rotatably connected to the receiving opening (51) at the inside thereof.

11. The spindle gear (1) as set forth in claim 1, wherein the thread element (4) engages under a spring loading radially into the spindle thread (21) with respect to the longitudinal axis (l).

12. The spindle gear (1) as set forth in claim 1, wherein in the installation position the thread element (4) is arranged secured in the receiving opening (51) against axial displacement with respect to the opening axis (ö) in the direction away from the spindle thread (21).

13. The spindle gear (1) as set forth in claim 1,
wherein the body (5) of the thread component (3) is arranged mounted on the spindle component (2) in slidingly displaceable relationship.

14. The spindle gear (1) as set forth in claim 1, wherein the spindle thread (21) includes at least one thread flight (22) which is of a constant configuration over its entire extent axially in the longitudinal axis (l) of the spindle component (2).

15. The spindle gear (1) as set forth in claim 1, wherein the spindle thread (21) is in the form of a trapezoidal thread.

16. The spindle gear (1) as set forth in claim 1, wherein the spindle thread (21) of the spindle component (2) has at least two thread flights (22), one thread element (4) being provided for each thread flight (22).

17. The spindle gear (1) as set forth in claim 16, wherein the at least two thread elements (4), in each case with respect to the longitudinal axis (l) of the spindle component (2), are arranged at the same level and peripherally equally spaced on the body (5) of the thread component (3).

18. The spindle gear (1) as set forth in claim 16, wherein the at least two thread elements (4) are structurally identical.

\* \* \* \* \*